J. SEIBEL.
Corn Planter
No. 47,990.  Patented May 30, 1865.
Fig. 1.
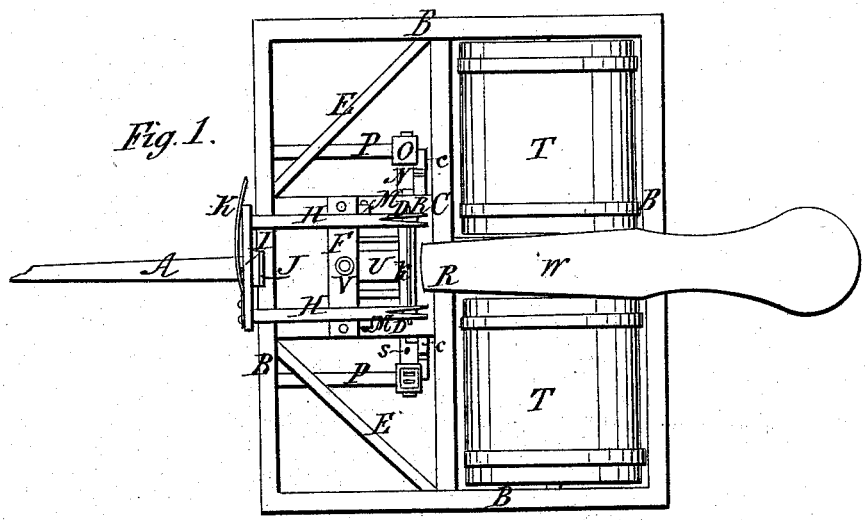
Fig. 2.
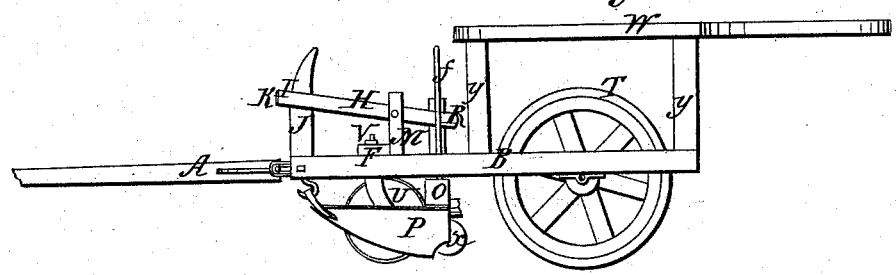
Fig. 4.  Fig. 3.
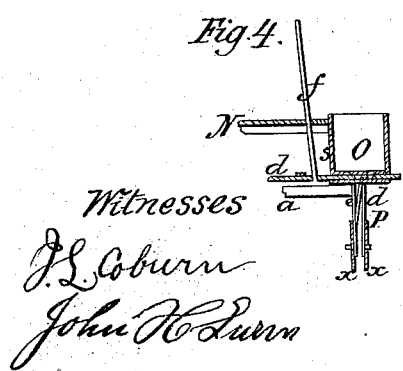
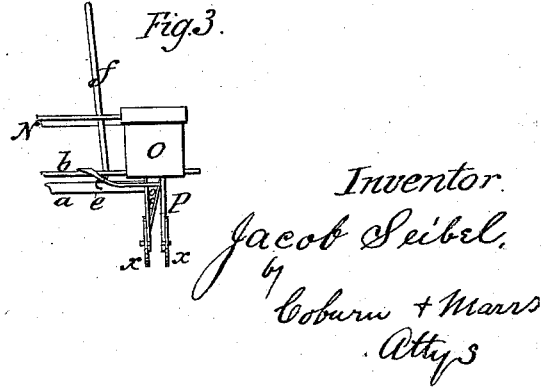
Witnesses
Inventor
Jacob Seibel
by
Coburn + Marrs
Attys

UNITED STATES PATENT OFFICE.

JACOB SEIBEL, OF MANLIUS, ILLINOIS.

IMPROVEMENT IN CORN-PLANTERS.

Specification forming part of Letters Patent No. 47,890, dated May 30, 1865.

*To all whom it may concern:*

Be it known that I, JACOB SEIBEL, of Manlius, in the county of Bureau and State of Illinois, have invented a new and useful Improvement in Corn-Planters; and I do hereby declare that the following is a full, clear, and exact description of the same, reference being had to the accompanying drawings and letters of reference marked thereon, which form a part of this specification, and in which—

Figure 1 represents a top view of my corn-planter; Fig. 2, a side elevation; Fig. 3, a side view of one of the seed-boxes, showing the attachments thereto; Fig. 4, a sectional view of the same.

The nature of my invention consists in circular cutters in the rear of the runners for the purpose of cutting the soil and all obstacles to prevent the runners from being thrown from the ground; also, the method of raising and lowering said runners to regulate the depth of planting the seed or throwing them from the ground entirely and the arrangement of the rollers.

To enable those skilled in the art to manufacture and use my invention, I will proceed to describe the same with particularity.

The same letters of reference refer to the corresponding parts in the different figures.

A represents the tongue of my machine, which is attached to the frame B in such a manner that no weight rests upon said tongue.

B is the outside frame, which is mortised together.

C is a cross-piece, and D D pieces extending from the front piece, B, to the cross-piece C.

E E are braces bracing said frame.

P P are runners attached to the front of the frame B by a hinged joint, so that its depth in the soil will not be controlled by the said frame. The seed-boxes O rest upon the rear of said runners under the said boxes. The runners are double, and in them there are tubes extending from the seed-boxes to the ground. On each side of these runners, at the rear, there is a circular cutter, X, which cuts the soil and any cornstalks or other material that might otherwise throw the runners from the ground, and thereby making the planting imperfect. As the machine is drawn, these cutters revolve, doing the work as described. In the seed-tubes in the rear of the runners there is a valve, $d$, which is hung on a pivot denoted by the red dot $e$, and the said valve is worked by the piece $c$, which is joined to the top of the valve, and also to the slide-bar $b$. The rear of the seed-tube, in which the valve $d$ works and to which the pivot $e$ is attached, is removed in Fig. 3 to show the interior of the tube. $a$ is a cross-piece connecting the two runners; $b$, a slide-bar, which extends through the bottom of the seed-boxes, and is moved back and forth by the lever $f$, to effect the dropping of the corn.

N is also a cross-piece between the seed-boxes, and at the same time serves as a fulcrum to the lever $f$. There are two standards, R R, that are joined to N, and extend up to the ends of the levers H H, and are joined thereto by means of the rod $k$. The levers H H rest on the standards M, which serve as their fulcrums, the other ends of said levers being joined together by the cross-piece I. There is a pin attached to the spring K, which passes through I and is adjustable in the different holes in the standard J. By this arrangement it is seen that by drawing back the spring K and removing the pin attached thereto from the standard J, and then bearing down on the cross-piece I, the levers H H are turned on their fulcrums M, and the runners P P are regulated to any desired depth in the ground, or thrown up clear from the ground, the front of the machine resting altogether upon the roller U. The roller U is made wide enough to cover the ground that passes under the cross-pieces that are under the seat W, between the rollers T, and turns on a swivel, V, so as to admit of the machine being turned abruptly. The rollers T T are made long, so that, in addition to their covering the corn, they can be used in connection with the roller U for rolling the whole surface of the ground, and when not planting corn by simply throwing the runners P P above the ground, as above described, the machine may be used to roll any field as well any roller. The seat W rests upon two standards, $y\ y$, so that the weight of the operator comes directly over the rollers T T. The inside of the seed-box is so arranged that at each motion of the lever, or at each time the bar $b$ is moved, there is seed enough for a hill of corn discharged from each seed-box; but the valve *d* is turned at the same movement of the slide-bar *b* by means of the connecting-piece *c* upon its pivot *e*, catching the seed just discharged from the seed-box and retaining it, having by the same motion dropped the preceding charge into the ground.

I am aware that the principle of the double drop is not new, and therefore do not claim it, broadly; but this manner of effecting the double drop I claim as my invention.

Having fully described my improved planting-machine, I will specify what I claim as new therein and desire to secure by Letters Patent—

1. The combination of the cutters *x x* and runners P, arranged and operating substantially as and for the purposes herein shown and described.

2. The combination and arrangement of the cutters *x x*, the runners P, jointed at the front end, the cross-bar N, standards R, levers H, cross-bar I, and standard J, operating as and for the purposes delineated and set forth.

JACOB SEIBEL.

Witnesses:
 W. E. MANS,
 LEWIS L. COBURN.